(12) United States Patent
Rouillard et al.

(10) Patent No.: US 8,137,568 B2
(45) Date of Patent: Mar. 20, 2012

(54) ROTARY DRUM VACUUM FILTER

(75) Inventors: Paul Norman Rouillard, Surrey (CA); Jean Paul Haramboure, Delta (CA); John Edward Leddy, Amherst, NH (US)

(73) Assignee: Andritz Ltd., Lachine, Quebec (CA)

( * ) Notice: Subject to any disclaimer, the term of this patent is extended or adjusted under 35 U.S.C. 154(b) by 1618 days.

(21) Appl. No.: 11/234,939

(22) Filed: Sep. 26, 2005

(65) Prior Publication Data
US 2007/0170108 A1 Jul. 26, 2007

(51) Int. Cl.
*B01D 33/06* (2006.01)
*B01D 35/00* (2006.01)
*B01D 33/00* (2006.01)

(52) U.S. Cl. ........ 210/784; 210/780; 210/404; 210/406; 210/402

(58) Field of Classification Search .......... 210/402–407, 210/784, 217, 324, 326, 247, 780, 781
See application file for complete search history.

(56) References Cited

U.S. PATENT DOCUMENTS

| | | | |
|---|---|---|---|
| 811,660 A | 2/1906 | Parker | |
| 923,870 A | 6/1909 | Meader | |
| 1,536,610 A | 5/1925 | Burnham | |
| 1,590,401 A * | 6/1926 | Wright et al. | 210/239 |
| 1,685,084 A * | 9/1928 | Hoyt | 162/306 |
| 1,878,998 A * | 9/1932 | Akins | 210/107 |
| 2,461,824 A * | 2/1949 | Komline | 210/401 |
| 2,899,068 A | 8/1959 | King et al. | |
| 3,363,774 A | 1/1968 | Luthi | |
| 3,680,708 A | 8/1972 | Luthi | |
| 3,837,499 A | 9/1974 | Luthi | |
| 3,947,361 A * | 3/1976 | Jackson | 210/391 |
| 4,154,687 A * | 5/1979 | LaValley | 210/392 |
| 4,168,234 A * | 9/1979 | Hutto, Jr. | 210/193 |
| 4,515,693 A * | 5/1985 | Luthi | 210/402 |
| 4,581,139 A * | 4/1986 | Kosonen | 210/232 |
| 4,673,496 A * | 6/1987 | Turner, Jr. | 210/232 |
| 4,680,115 A * | 7/1987 | LaValley | 210/247 |
| 5,281,343 A | 1/1994 | Lewis et al. | |
| 5,480,545 A * | 1/1996 | Lewis | 210/380.3 |
| 5,674,396 A * | 10/1997 | Wenzl et al. | 210/324 |
| 5,683,582 A * | 11/1997 | Luthi | 210/404 |
| 2008/0087391 A1* | 4/2008 | Grace | 162/13 |

\* cited by examiner

*Primary Examiner* — Tony G Soohoo
*Assistant Examiner* — David C Mellon
(74) *Attorney, Agent, or Firm* — Greer, Burns & Crain, Ltd.

(57) ABSTRACT

Prior art washer designs have segmented radial ducts feeding the filter valve which collect the filtrate emerging from the longitudinal ducts. Because these ducts are radial, the volume at the periphery is much greater than at the valve entry which creates undesirable conditions such as a large volume where air can escape from the filtrate forming a pocket which will reduce the effectiveness of the vacuum and promote non-uniformity in filtrate velocity. The present invention incorporates a baffle in the radial duct which reduces the volume at the periphery and maintains a uniform cross-sectional area for the filtrate to reach the valve. This maintains a constant filtrate velocity and prevents the possibility of the formation of an air pocket.

14 Claims, 6 Drawing Sheets

ROTARY DRUM VACUUM FILTER

TECHNICAL FIELD

The invention relates to the field of rotary drum vacuum filters.

BACKGROUND

Rotary drum vacuum filters are used in the chemical, pharmaceutical and pulp and paper industries to separate suspended solids from a slurry. Some applications, for example, are in the drying of effluent and sewage sludge. The function of the rotary drum vacuum filter is to remove the insoluble solids from the mother liquor, dry them, then form a cake or mat, and discharge them. The remaining mother liquor from which the insoluble solids have been removed is then discharged as filtrate. Depending on the application, the cake or mat can be washed using a weaker liquor while still on the drum prior to discharge. In applications where the suspended solids tend to settle in the vat, the solids are maintained in suspension in the vat by use of an agitator.

The rotary drum vacuum filter is constructed as a totally enclosed drum rotating partially submerged in a vat. Attached to the vat on one side is an inlet box which serves to collect the incoming slurry and permit uniform distribution into the main vat in which the drum is rotating. On the opposite side to the inlet box is a vat containing a repulper which receives the discharging cake or mat. The surface of the drum is covered with decking which supports a fine wire or synthetic mesh which serves to separate the suspended solids from the slurry. The decking can comprise wire winding, perforated plate, perforated plastic mat or corrugated stainless steel deck. The motive force for separation of the solids is normally a vacuum applied to the underside of the decking. This vacuum is provided either by a vacuum pump or, in the case of the pulp and paper industry where the solids are fibrous and therefore free draining, by a drop leg attached to the filter valve. Alternatively the drum/vat configuration can be totally enclosed by a hood which is pressurized. The decking is typically supported by longitudinal division bars together with intermediate bars. The division bars form ducts to carry the filtrate from beneath the decking and out of the drum through a valve or valves. The intermediate bars provide support for the decking and fine wire between the division bars and are perforated to permit the flow of filtrate across the shell surface or wrapper of the drum between the division bars.

The filtrate formed by the separation of solids from the mother liquor can be collected from underneath the decking in a variety of ways, but always exits by a valve, or sometimes two valves, located in the trunnion or at the rear end of the drum. A first common method of conveying the filtrate from the ducts between the division bars is to incorporate a ring of drainage buckets in the centre of the drum wrapper beneath the decking to collect the filtrate and then convey the filtrate to the valve or valves by means of pipes between the drainage bucket outlets and the valve itself. The number of pipes is equal to that of the number of longitudinal division bars and the pipes terminate in the valve area such that there is an individual outlet for each pipe. With this system, filtrate travels between the longitudinal division bars from each end of the drum before collection in the drainage buckets. In this way a stationary valve segment can be positioned in order to control which part of the filtration cycle requires the application of vacuum and in which part the pipe outlets should be blanked off corresponding to the portion of the cycle where vacuum is not required i.e. in the final phase of drying and where the cake or mat is removed.

A second common method involves end drainage. In the case of slow draining materials which produce a low volume of filtrate e.g. flocculated sewage sludge, it has been common to replace the internal piping concept by an end drainage system. According to this method, the filtrate passes longitudinally from one end of the filter surface to the other without the use of central drainage buckets. This design maintains the concept of drainage ducts incorporated in the drum surface bounded by the division bars. Instead of the filtrate flowing to the valve by internal piping, it exits through piping outside of the drum head directly into the filter valve. In recent years, such end drainage systems have been used for the pulp and paper industry for wood pulps having high, drainage rates. For slow draining pulps like bagasse, which exit small volumes of filtrate, the radial vertical pipe configuration outside the drum head is maintained. For fast draining wood pulps generating large volumes of mother liquor, the depth of the division bars is increased forming longitudinal ducts of uniform depth. The filtrate emerging from the longitudinal ducts passes though vertical, radial ducts which are incorporated in a segmented chamber inside the drum head to the valve area prior to discharge through the drop leg.

The range of rotational speeds required of vacuum filters varies widely depending on the application and can vary between 0.1 and 6 rpm. Various configurations of drive are used, some being trunnion mounted worm gear drives and others shaft mounted drives. In all cases, the speed of the filter can be varied, and different methods are used including, variable pulleys, hydraulic gears, variable speed DC motors and hydraulic motors.

The pulp mat must be discharged after the final drying part of the cycle and various devices are used to carry out this part of the operation. The simplest device for the take-off purpose is the metallic doctor blade, but this has the disadvantage of damaging the fine wire filtration medium. An improvement has been to raise the doctor blade from the surface of the drum and discharge a large volume of low pressure air between the tip of the doctor blade and the drum surface which lifts the pulp mat off the drum surface and onto the upper surface of the blade from whence it falls by gravity into the repulper conveyor. An alternative to this device is one where water is used instead of air. An earlier device was the fluted metallic roll which lifted the pulp mat off the drum surface onto an adjacent rubber covered roll from which the mat was removed by a metal doctor blade.

Both the pipe filter and end drainage designs of vacuum filter described above have inherent disadvantages. The ideal vacuum filter needs to exit filtrate from the drum internals in the shortest time possible. This is achieved by having the shortest residence time of filtrate possible inside the drum which is achieved by filtrate traveling through the filter internals by the shortest route possible and at constant velocity. There needs to be minimum turbulence in the flow of filtrate and the minimum of pressure drops which reduce the effectiveness of the vacuum applied. Pockets of air need to be avoided since these permit the exit of air entrained in the filtrate into the air pocket which is detrimental to the maintenance of vacuum. In the case of the conventional pipe filter described above, the filtrate is collected from both ends of the longitudinal duct between the division bars and the underside of the decking prior to collection in the centrally located drainage buckets. This means that half of the filtrate volume travels in one direction while the other half travels in the opposite direction, both meeting in the drainage bucket appropriate to that longitudinal duct the filtrate and creating an environment of extreme turbulence. Where the filter only has one valve, that half of the filtrate volume whose flow started from the valve end of the drum will need to reverse direction and flow in the direction from which it started prior to exiting the valve.

In the case of designs having segmented radial ducts feeding the filter valve which collect the filtrate emerging from the longitudinal ducts, because these ducts are radial, the cross-sectional area at the periphery is much greater than at the valve entry. This creates an undesirable condition, namely a large volume where air can escape from the filtrate forming a pocket which will reduce the effectiveness of the vacuum and promote non-uniformity in filtrate velocity.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

The invention therefore provides a rotary vacuum filter drum for rotation about a central longitudinal axis, comprising a filtrate discharge end having a discharge valve and a second non-discharge end, and further comprising: i) a cylindrical, perforated outer filter deck for supporting a layer of filtered material; ii) a cylindrical inner deck mounted for rotation about the central axis; iii) a plurality of longitudinal elements extending radially between and secured to the inner and outer decks thereby forming a plurality of longitudinally extending ducts; iv) a radially extending passageway between one or more of the longitudinally extending ducts and the discharge valve; wherein the longitudinal ducts increase in cross-sectional area from the non-discharge end to the discharge end and the radially extending passageway is generally constant in cross-sectional area from the outer end to the inner end. The invention also provides a method of filtering suspended solids from a slurry.

According to one aspect the invention incorporates a baffle in the radial duct which reduces the volume at the periphery and maintains a uniform cross-sectional area for the filtrate to reach the valve. This maintains a constant filtrate velocity and reduces the possibility of the formation of an air pocket.

In addition to the exemplary aspects and embodiments described above, further aspects and embodiments will become apparent by reference to the drawings and by study of the following detailed descriptions.

BRIEF DESCRIPTION OF DRAWINGS

Exemplary embodiments are illustrated in referenced figures of the drawings. It is intended that the embodiments and figures disclosed herein are to be considered illustrative rather than restrictive.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Figure 1:
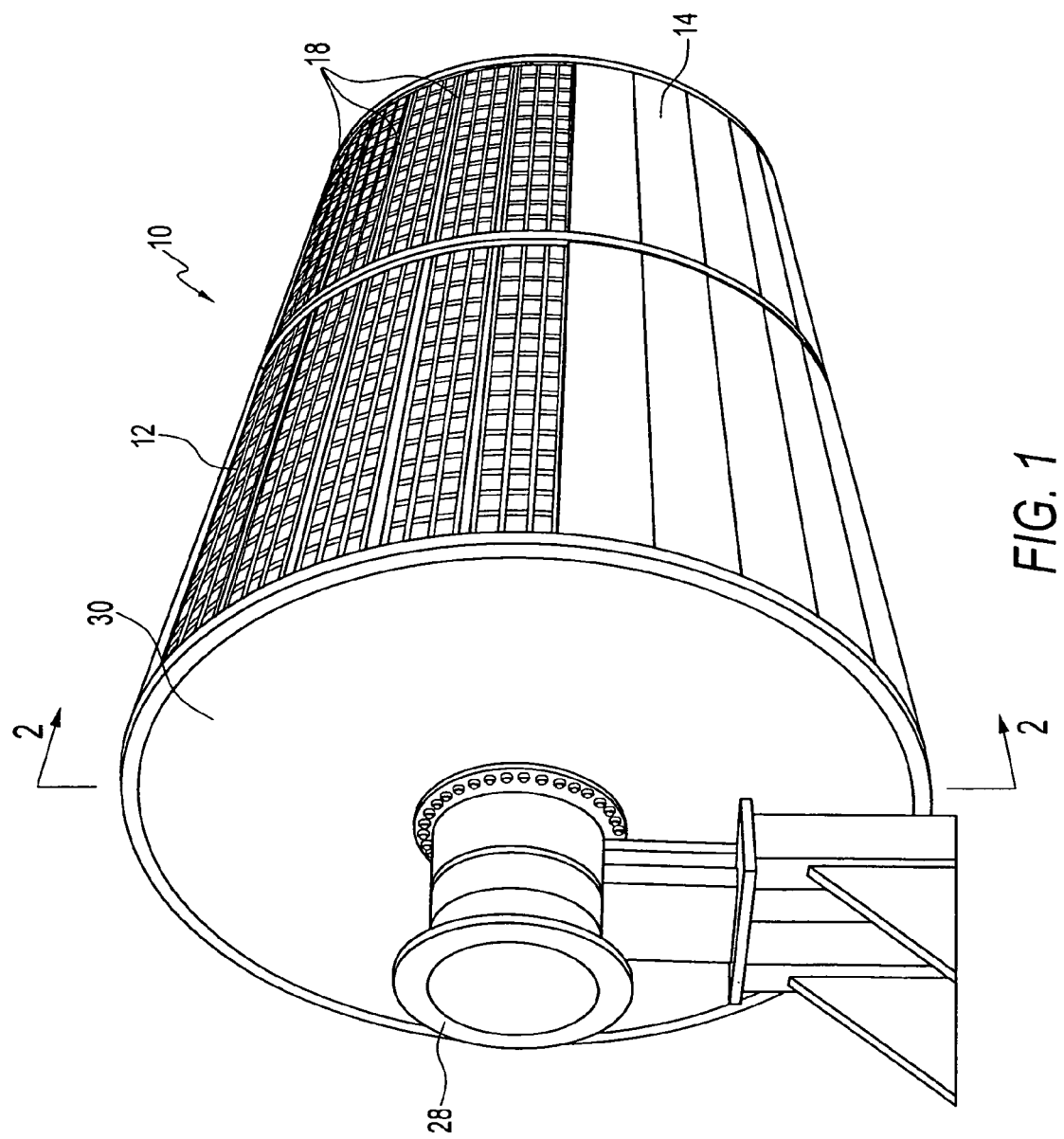
FIG. 1 is a perspective view of a rotary drum vacuum filter with the outer decking partially removed to illustrate the division bars.
Figure 2:
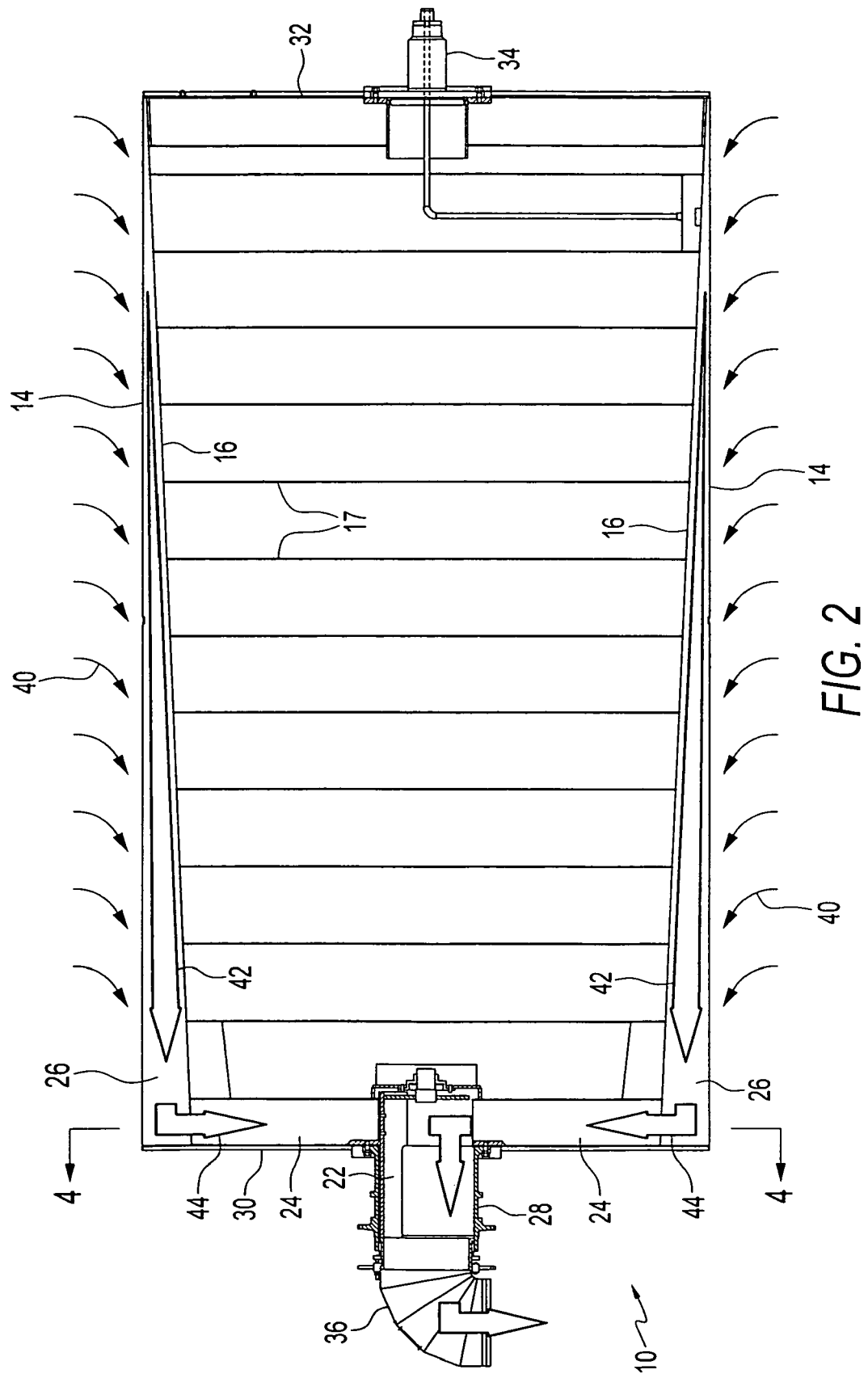
FIG. 2 is a cross-sectional view taken along line 2-2 of FIG. 1, of a rotary drum vacuum filter according to a first embodiment of the invention, showing schematically, not to scale, filtrate flow through the drum.
Figure 3:
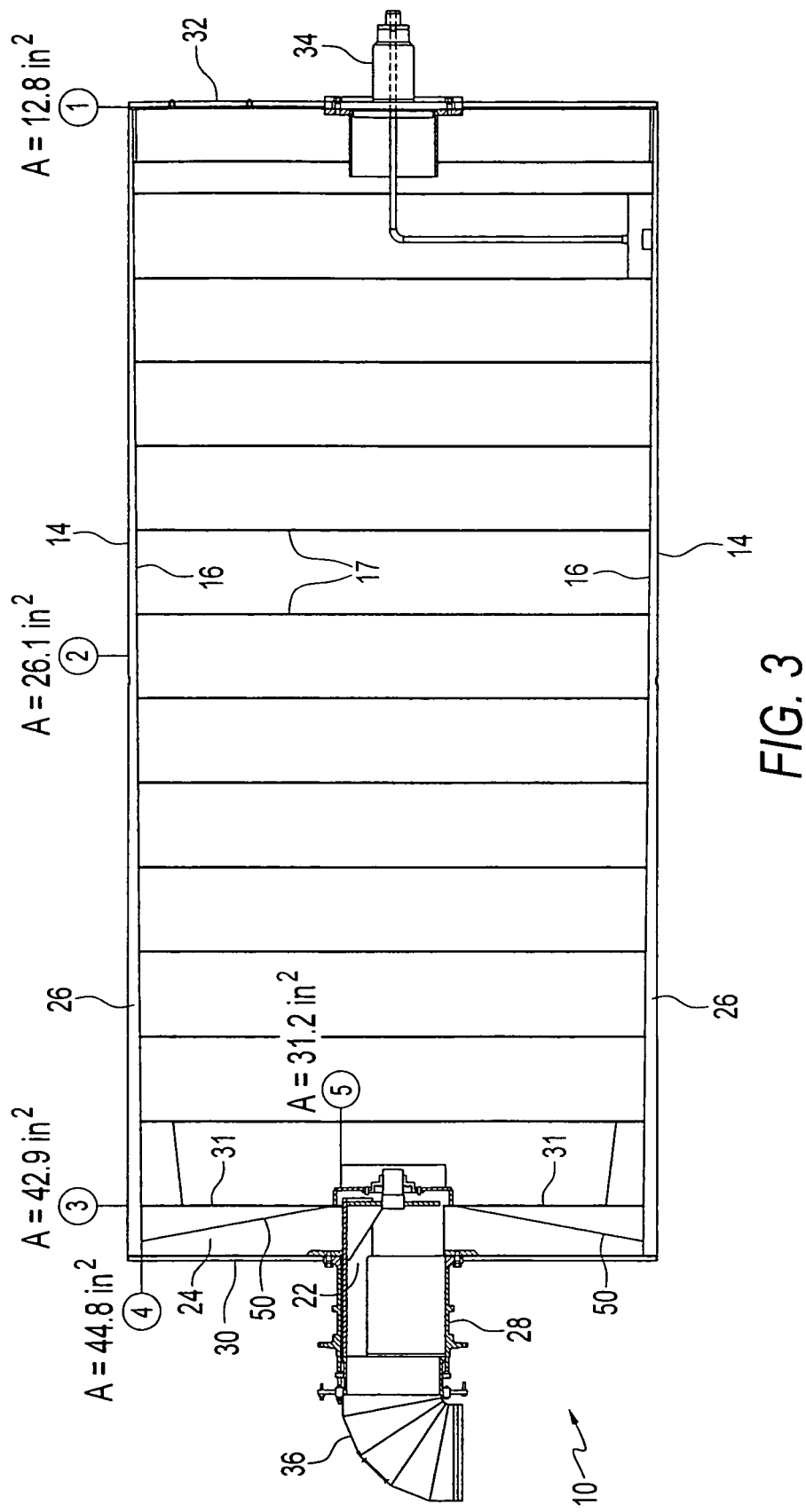
FIG. 3 is a cross-sectional view of a rotary drum vacuum filter taken along line 2-2 of FIG. 1 according to a first embodiment of the invention, indicating exemplary cross-sectional areas of the longitudinal ducts at various points along the length of the drum.

With reference to FIG. 1 to 3, a rotary drum vacuum filter 10 has a cylidrical outer deck formed of corrugated decking panels 12 which support a fine wire or synthetic mesh outer surface 14. Radially inwardly of decking panels 12 is a solid inner cylindrical metal shell 16 supported on radial discs 17. The decking panels 12 are supported by longitudinal division bars 18, and possibly also intermediate bars having apertures to permit fluid flow there-between. The division bars 18 with inner shell 16 form ducts 26 for the passage of filtrate. Ducts 26 collect filtrate from the decking panels 12 and carry it to radial conduits 24 formed by conduit plates 20 and out through valve 22, flange and drop leg 36. Intermediate bars (shown in FIG. 1) may be provided for added support for decking panels 12 and are perforated to permit the flow of filtrate across the shell 16 of the drum between division bars 18.

Drum 10 has end plates 30, 32 and rotates on axle 34. Vacuum is applied to drop leg 36 when desired to remove filtrate.

FIG. 2 illustrates schematically the filtrate flow through the drum 10 commencing at the surface 14 of the drum and illustrating by arrows 40 a uniform flow through the outer surface 14 of the drum 10. This will provide for a uniform volume of filtrate to be drained per unit of surface area of the drum 10. The filtrate flows through the decking panels 12 and into the ducts 26 between the division bars 18. The cross sectional area of the ducts 26 between the division bars is increased from end 32 towards end 30 to maintain a constant velocity of filtrate along the ducts 26 as the volume of filtrate flowing through the ducts 26 increases, as illustrated by arrows 42. The filtrate is turned through 90 degrees into the radial conduits 24, as shown by arrows 44, and flows towards the central axis of the drum where the valve 22 is located. The volume of filtrate remains constant through the conduit section 24 of the drum and out through the valve 22 and drop leg 36.

FIG. 3 illustrates a section through an exemplary drum used for processing pulp indicating the cross-sectional areas of each duct 26 at various points commencing with a small cross sectional area such as 12.8 square inches in the ducts 26 at point 1 at the non-value end 30 of the drum and increasing along the length of the drum to the valve end 32 of the drum, with an area of 26.1 square inches at point 2 and 42.9 square inches at point 3. The area increases marginally to 44.8 square inches at the point of entry 4 into the radial conduits 24 and decreases towards the center of the drum due to the baffle 50 described in more detail below, the smallest cross sectional area, 31.2 square inches, being at the interface 5 with the valve 22. These dimensions are representative only and will be selected to suit the particular application and operating conditions for each process.

Figure 4:
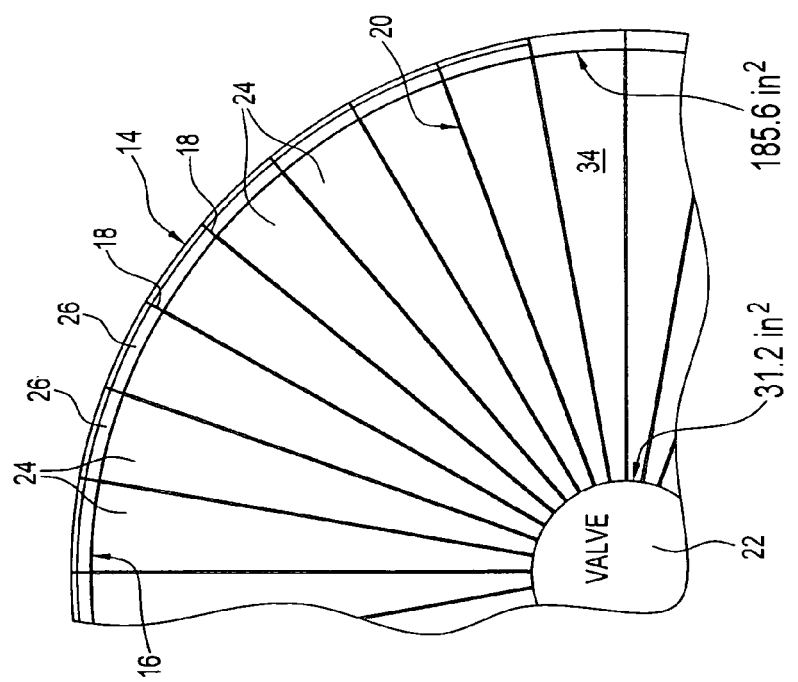
FIG. 4 is a partial cross-sectional view of a rotary drum vacuum filter taken along line 4-4 of FIG. 2.

FIG. 4 illustrates a section through the conduit 24 area of the drum 10 viewed along the drum axis with baffles 50 removed. Conduit plates 20 are arranged in a radial pattern and are sandwiched between two parallel end plates 30, 31 thus creating tapered conduits 24 reducing in cross sectional area towards the center axis of the drum 10. In the absence of baffle plates 50 the cross-sectional area at the entrance to conduit 24 is typically 185.6 square inches while at the inner radius adjacent valve 22 it is 31.2 square inches.

Figure 5:
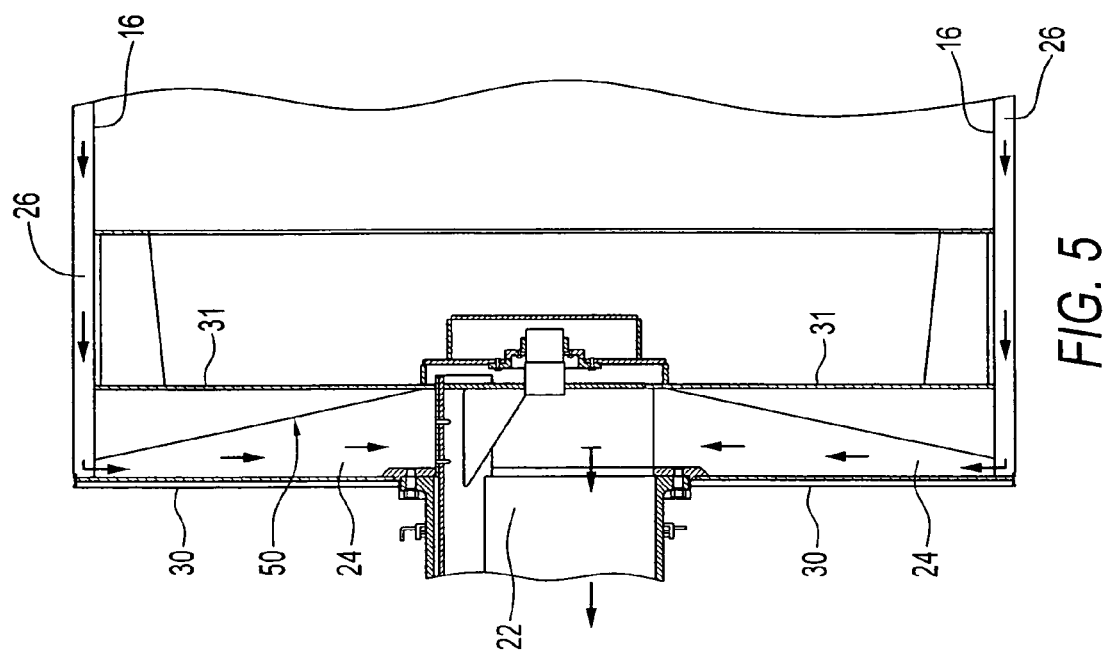
FIG. 5 is a partial cross-sectional view of a rotary drum vacuum filter taken along line 2-2 of FIG. 1 according to a first embodiment of the invention, with a baffle inserted into the conduit area.

FIG. 5 illustrates a section through the valve end of the drum with a baffle plate 50 inserted into the conduit 24. Conduit plates 20 are arranged in a radial pattern as illustrated in FIG. 4 and are sandwiched between two parallel end plates thus creating tapered conduit sections reducing in cross sectional area towards the center of the drum. The introduction of baffle plates 50 into each conduit 24 forming a wedge-shaped section which creates a uniform cross sectional area for the filtrate to flow through. The filtrate velocity variance through the conduit 24 section of the drum is thus kept to a minimum.

Figure 6:
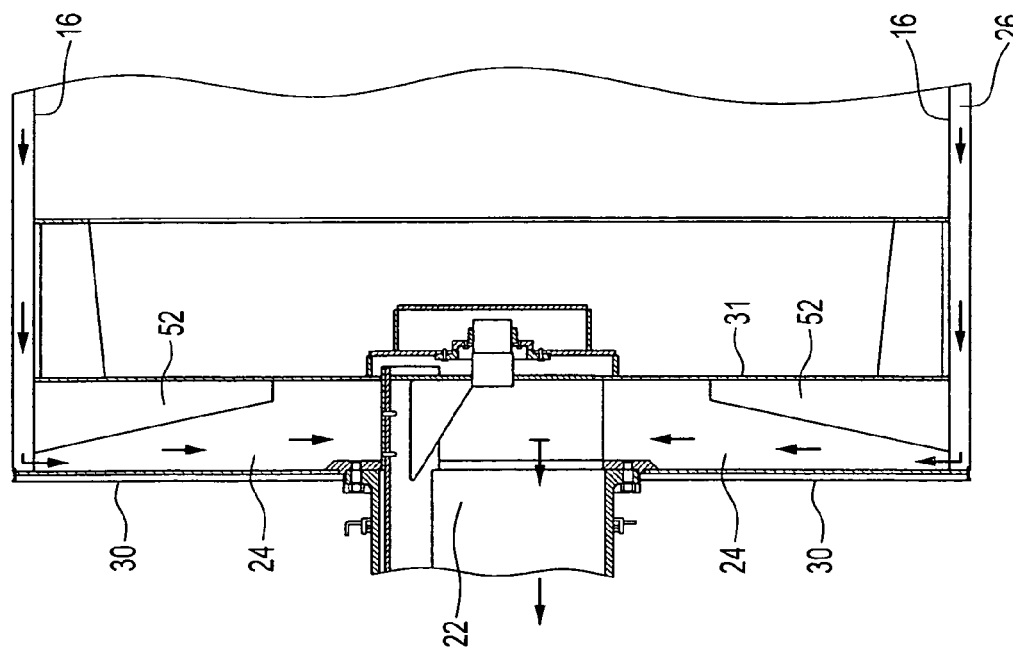
FIG. 6 is a partial cross-sectional view of a rotary drum vacuum filter taken along line 2-2 of FIG. 1 according to a second embodiment of the invention, with a truncated baffle inserted into the conduit area.

FIG. 6 illustrates a further embodiment of the invention, showing a section through the valve end of the drum 10 with a truncated baffle plate 52 inserted into the conduit area 24 as described in FIG. 5. This design provides for minimal velocity changes and enhances the manufacturability of the drum.

Figure 7:
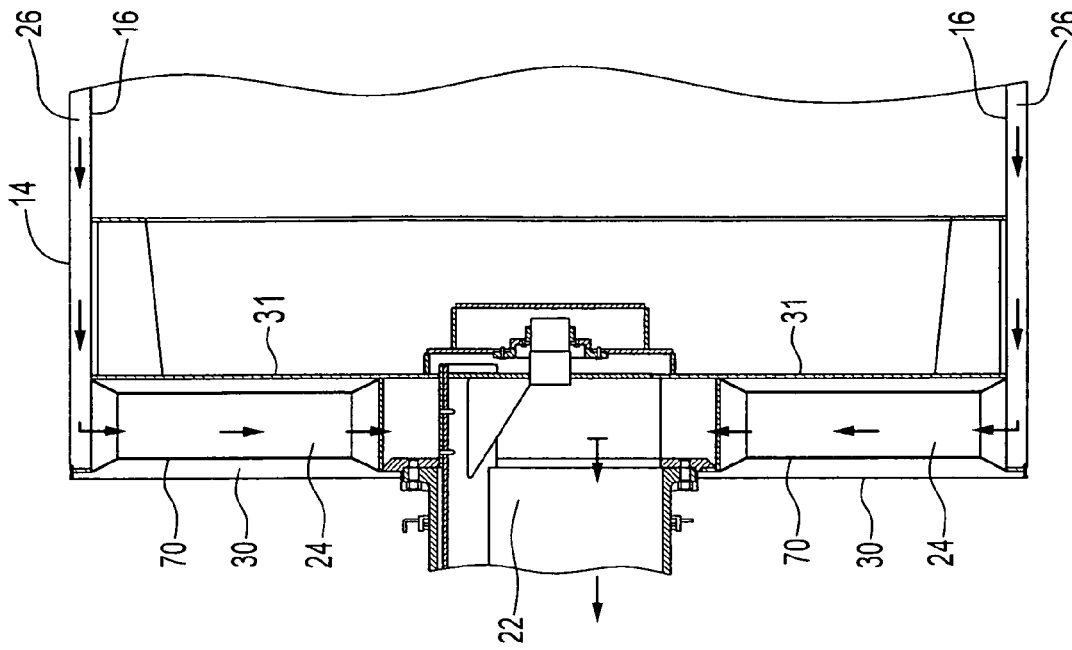
FIG. 7 is a partial cross-sectional view of a rotary drum vacuum filter taken along line 2-2 of FIG. 1 according to a third embodiment of the invention, with a tubular conduit system.

FIG. 7 illustrates a tubular conduit system that maintains the same cross sectional area between the ducts 26 at the outside of the drum and the valve 22 by providing oval tubes 70 of uniform dimension in a longitudinal direction but a radially decreasing dimension in a circumferential direction so that the cross-sectional area is radially uniform. This design provides minimal velocity variation at the valve end of the drum.

Figure 8:
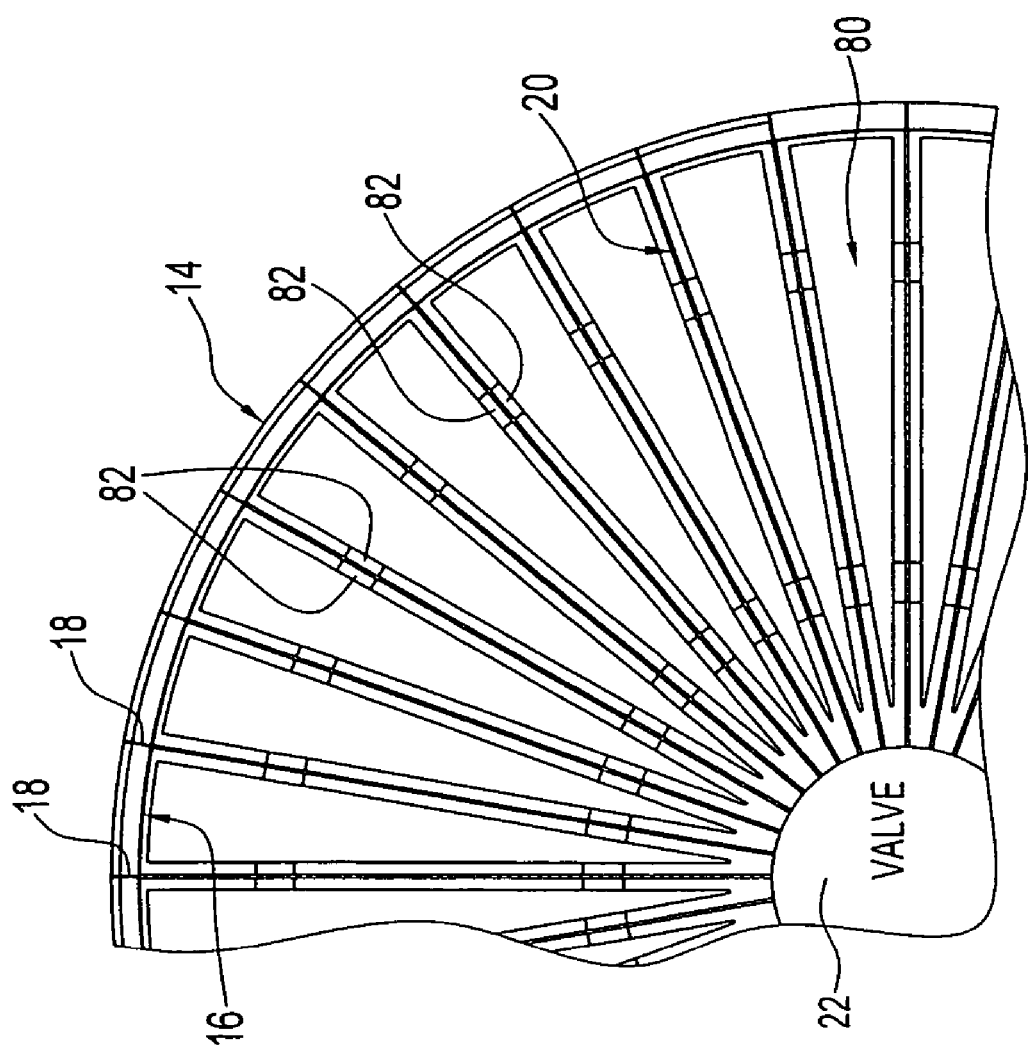
FIG. 8 is a partial cross-sectional view of a rotary drum vacuum filter taken along line 4-4 of FIG. 2, showing an insert fitted into the conduits.

FIG. 8 illustrates a tapered box insert 80 fitted into each conduit 24 that reduces the open area available for the filtrate to flow, thus achieving the benefit of maintaining minimum velocity variation in the conduit area of the drum. The tapered box insert 80 is secured to conduit plates 20 by bars 82 by welding or the like and is designed to partially fill the volume in the conduit 24 and in so doing maintain a uniform cross-section for filtrate to flow through while it passes through this area. These inserts 80 can be manufactured in a variety of materials including those traditionally used in the manufacture of the drums and could also be manufactured in other suitable materials such as plastic or fiberglass. The inserts 80 are designed to be suitable for new drums and for retrofitting existing drums.

Thus the invention eliminates the need for buckets and thus eliminates the area of high turbulence as well as maintaining the flow of filtrate in one direction only. Further, it will be understood that each unit area of drum surface will receive the same volume of filtrate prior to its passage along the duct formed between the division bars. As the filtrate flows to the end of its duct, the flow will be increased in volume in proportion to the face length of the drum. If the depth of the duct is uniform, the velocity of filtrate at the end of the duct farthest away from the valve will be the lowest, and so the residence time of filtrate at this end will be longest. In order to maintain a uniform filtrate velocity and a minimum filtrate residence time, this invention incorporates tapered longitudinal ducts shallower at the non-valve end and deeper at the valve end of the drum.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. An end drainage rotary vacuum filter drum for rotation about a central longitudinal axis, comprising a filtrate discharge end having an axially located discharge valve and a second non-discharge end, and further comprising:
   i) a cylindrical, perforated outer filter deck for supporting a layer of filtered material;
   ii) a cylindrical inner deck mounted for rotation about said central axis;
   iii) a plurality of longitudinal elements extending radially between and secured to said inner and outer decks thereby forming a plurality of longitudinally extending ducts extending between said non-discharge end and said discharge end of said filter drum;
   iv) a radially extending passageway adjacent said discharge end of said filter drum communicating between one or more of said longitudinally extending ducts at the radially outer end of said radially extending passageway and said axially located discharge valve at the radially inner end of said radially extending passageway;
   wherein said longitudinally extending ducts increase in cross-sectional area from the non-discharge end to the discharge end and said radially extending passageway is substantially constant in cross-sectional area from said outer end to said inner end in a direction perpendicular to the filtrate flow whereby the velocity of the filtrate flow is kept substantially constant from said non-discharge end to said discharge valve;
   wherein said radially extending passageway comprises two parallel end plates adjacent said discharge end.

2. The rotary vacuum filter drum of claim 1 wherein said radially extending passageway comprises a plurality of radially extending plates extending longitudinally between said end plates forming a plurality of radially extending conduits, each communicating at its outer end with one or more of said ducts and at its inner end with said discharge valve.

3. The rotary vacuum filter drum of claim 2 wherein each said radially extending conduit comprises a baffle plate extending annularly across each said radially extending conduit and angled in a longitudinal direction from a location at its outer radial end adjacent to said discharge end to a location at its inner radial end closer to said non-discharge end, whereby each said radially extending conduit is substantially constant in cross-sectional area from its outer end to its inner end in a direction perpendicular to the filtrate flow.

4. The rotary vacuum filter drum of claim 3 wherein said baffle plate is truncated at its inner end.

5. The rotary vacuum filter drum of claim 2 wherein each said radially extending conduit comprises a wedge shaped insert secured within each said radially extending conduit and tapering in the circumferential dimensions from its outer radial end to its inner radial end, whereby each said radially extending conduit is substantially constant in cross-sectional area from its outer end to its inner end in a direction perpendicular to the filtrate flow.

6. The rotary vacuum filter drum of claim 1 wherein said radially extending passageway comprises a plurality of radially extending tubular elements, each communicating at its outer end with one or more of said ducts and at its inner end with said discharge valve whereby each said radially extending conduit is substantially constant in cross-sectional area from its outer end to its inner end in a direction perpendicular to the filtrate flow.

7. The rotary vacuum filter drum of claim 6 wherein each said radially extending tubular element tapers in the circumferential dimension from its outer radial end to inner radial end.

8. A method of filtering suspended solids from a slurry comprising:
   (a) providing an end drainage rotary vacuum filter drum having a filtrate discharge end having an axially located discharge valve and a second non-filtrate-discharge end, said rotary vacuum filter drum mounted for rotation about a central axis and comprising:
      i) a cylindrical, perforated outer filter deck for supporting a layer of filtered material;
      ii) a cylindrical inner deck mounted for rotation on said shaft;
      iii) a plurality of longitudinal elements extending radially between and secured to said inner and outer decks thereby forming a plurality of longitudinally extending ducts extending between said non-discharge end and said discharge end of said filter drum;
      vii) a radially extending passageway adjacent said discharge end of said filter drum communicating between one or more of said longitudinally extending ducts at the radially outer end of said radially extending passageway and said axially located discharge valve at the radially inner end of said radially extending passageway;
      wherein said longitudinally extending ducts increase in cross-sectional area from the non-discharge end to the discharge end and said radially extending passageway is substantially constant in cross-sectional area from said outer end to said inner end in a direction perpendicular to the filtrate flow;
   b) partially submerging said rotary drum filter in said slurry;
   c) rotating said rotary drum filter about said central shaft;
   d) providing a lower pressure at said discharge valve compared to the pressure at said outer filter deck thereby causing a filtrate flow through said longitudinally extending ducts and said radially extending passageway to said discharge valve, whereby the velocity of the filtrate flow is kept substantially constant from said non-discharge end to said discharge valve;
   e) progressively removing said filtered material from said outer filter deck;
   wherein said radially extending passageway comprises two parallel end plates adjacent said discharge end.

9. The method of claim 8 wherein said radially extending passageway comprises a plurality of radially extending plates extending longitudinally between said end plates forming a plurality of radially extending conduits, each communicating at its outer end with one or more of said ducts and at its inner end with said discharge valve.

10. The method of claim 9 wherein each said radially extending conduit comprises a baffle plate extending annularly across each said radially extending conduit and angled in a longitudinal direction from a location at its outer radial end adjacent to said discharge end to a location at its inner radial end closer to said non-discharge end, whereby each said radially extending conduit is substantially constant in cross-sectional area from its outer end to its inner end in a direction perpendicular to the filtrate flow.

11. The method of claim 10 wherein said baffle plate is truncated at its inner end.

12. The method of claim 9 wherein each said radially extending conduit comprises a wedge shaped insert secured within each said radially extending conduit and tapering in the circumferential dimensions from its outer radial end to its inner radial end, whereby each said radially extending conduit is substantially constant in cross-sectional area from its outer end to its inner end in a direction perpendicular to the filtrate flow.

13. The method of claim 8 wherein said radially extending passageway comprises a plurality of radially extending tubular elements, each communicating at its outer end with one or more of said ducts and at its inner end with said discharge valve whereby each said radially extending tubular element is substantially constant in cross-sectional area from its outer end to its inner end in a direction perpendicular to the filtrate flow.

14. The method of claim 13 wherein each said radially extending tubular element tapers in the circumferential dimension from its outer radial end to inner radial end.

* * * * *

UNITED STATES PATENT AND TRADEMARK OFFICE
CERTIFICATE OF CORRECTION

PATENT NO. : 8,137,568 B2  
APPLICATION NO. : 11/234939  
DATED : March 20, 2012  
INVENTOR(S) : Rouillard et al.

Page 1 of 1

It is certified that error appears in the above-identified patent and that said Letters Patent is hereby corrected as shown below:

In the Claims:

Col. 7, line 19  
Claim 7, line 3      After "end to", please insert --its--.

Col. 7, line 37  
Claim 8, line 17      Please delete "vii)" and insert --iv)-- therefor.

Signed and Sealed this  
Twelfth Day of June, 2012

David J. Kappos  
*Director of the United States Patent and Trademark Office*